(12) United States Patent
Watanabe et al.

(10) Patent No.: US 6,513,505 B2
(45) Date of Patent: Feb. 4, 2003

(54) FUEL FEEDING DEVICE FOR ENGINE

(75) Inventors: Yoshimasa Watanabe, Shizuoka-ken (JP); Toshiaki Konomi, Susono (JP); Kazuhiro Omae, Atsugi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/991,954

(22) Filed: Nov. 26, 2001

(65) Prior Publication Data

US 2002/0062822 A1 May 30, 2002

(30) Foreign Application Priority Data

Nov. 29, 2000 (JP) .......................................... 2000-363450

(51) Int. Cl.⁷ .............................................. F02M 21/02
(52) U.S. Cl. ..................................... 123/525; 123/25 R
(58) Field of Search ................................. 123/527, 468, 123/525, 25 R, 575, 442, 456, 447

(56) References Cited

U.S. PATENT DOCUMENTS 4,373,493 A * 2/1983 Welsh ......................... 123/525
4,953,516 A * 9/1990 Van der Weide et al. ... 123/527
5,816,224 A * 10/1998 Welsh et al. ................. 123/525
6,213,104 B1 * 4/2001 Ishikiryama et al. ........ 123/557

FOREIGN PATENT DOCUMENTS

| JP | B2 2651974 | 5/1997 |
| JP | A 9-280123 | 10/1997 |
| JP | A 10-141170 | 5/1998 |
| JP | A 11-241657 | 9/1999 |

* cited by examiner

Primary Examiner—Willis R. Wolfe
Assistant Examiner—Mahmoud Gimie
(74) Attorney, Agent, or Firm—Oliff & Berridge, PLC (57) ABSTRACT

Injectors 2 are connected to a common rail 4 via respective dispensing conduits 3. A mixture of a liquid fuel fed from a liquid fuel tank 2 and an additional fluid fed from an additional fluid tank 9 is formed, and is fed to the common rail 4. The additional fluid contained in the mixture is turned to its supercritical state, and the mixture is injected from the injectors 2 to the engine. The inlets of the dispensing conduits 3 are positioned, with respect to the common rail 4, to open out into a liquid fuel layer which will be formed in the common rail 4 when a separation of the mixture occurs.

17 Claims, 5 Drawing Sheets

FUEL FEEDING DEVICE FOR ENGINE

BACKGROUND OF THE INVENTION

1. Field of the Invention

The present invention relates to a fuel feeding device for an engine.

2. Description of the Related Art

Japanese Patent No. 2651974 discloses an engine having a receiver, an injector, and a supply conduit connected therebetween, wherein a mixture of a liquid fuel and an additional fluid in which the additional fluid is in its supercritical state is formed in the receiver, and the mixture is injected from the injector to the engine.

This promotes the atomization of the liquid fuel and therefore provides a good combustion. The reason therefor will be explained, in detail, later.

When, however, the engine is stopped and the temperature in the receiver is lower than the critical temperature of the additional fluid, a separation of the mixture occurs. Finally, layers of the liquid fuel and the additional fluid are formed in the receiver. When the engine is then restarted, the temperature in the receiver cannot exceed the critical temperature of the additional fluid immediately, and therefore the additional fluid cannot be its supercritical state immediately. Accordingly, at this time, the liquid fuel may be injected with the additional fluid which is in the form of a large particle of fluid or gas. In addition, if an outlet of the supplying conduit is connected to the receiver to open out into the additional fluid layer, no fuel may be fed to the engine.

SUMMARY OF THE INVENTION

An object of the invention is to provide a fuel feeding device which is capable of preventing the combustion from deteriorating when the additional fluid in the receiver is not in its supercritical state.

According to the present invention, there is provided a fuel feeding device for an engine, comprising: a source of a liquid fuel; a source of an additional fluid; a receiver; mixture forming means for forming in the receiver a mixture of the liquid fuel and the additional fluid fed from the respective sources, the additional fluid in the mixture being in its supercritical state; an injector for injecting the mixture in the receiver to the engine; and a supplying passage for supplying the mixture from the receiver to the injector, the supplying passage having an inlet which opens out in the receiver, wherein the additional fluid has a density different from that of the liquid fuel, which results in, when a separation of the mixture in the receiver is occurred, that layers of the liquid fuel and the additional fluid are formed in the receiver, and wherein the inlet of the supplying passage is positioned with respect to the receiver to open out in the liquid fuel layer.

Note that, in general, a material is considered to be in its supercritical state when the pressure thereof is made higher than its critical pressure and the temperature thereof is made higher than its critical temperature. However, in the present invention, a material is also considered to be in its supercritical state even when the pressure thereof is slightly lower than its critical pressure and the temperature thereof is slightly lower than its critical temperature.

DESCRIPTION OF THE PREFERRED EMBODIMENTS

Figure 1:
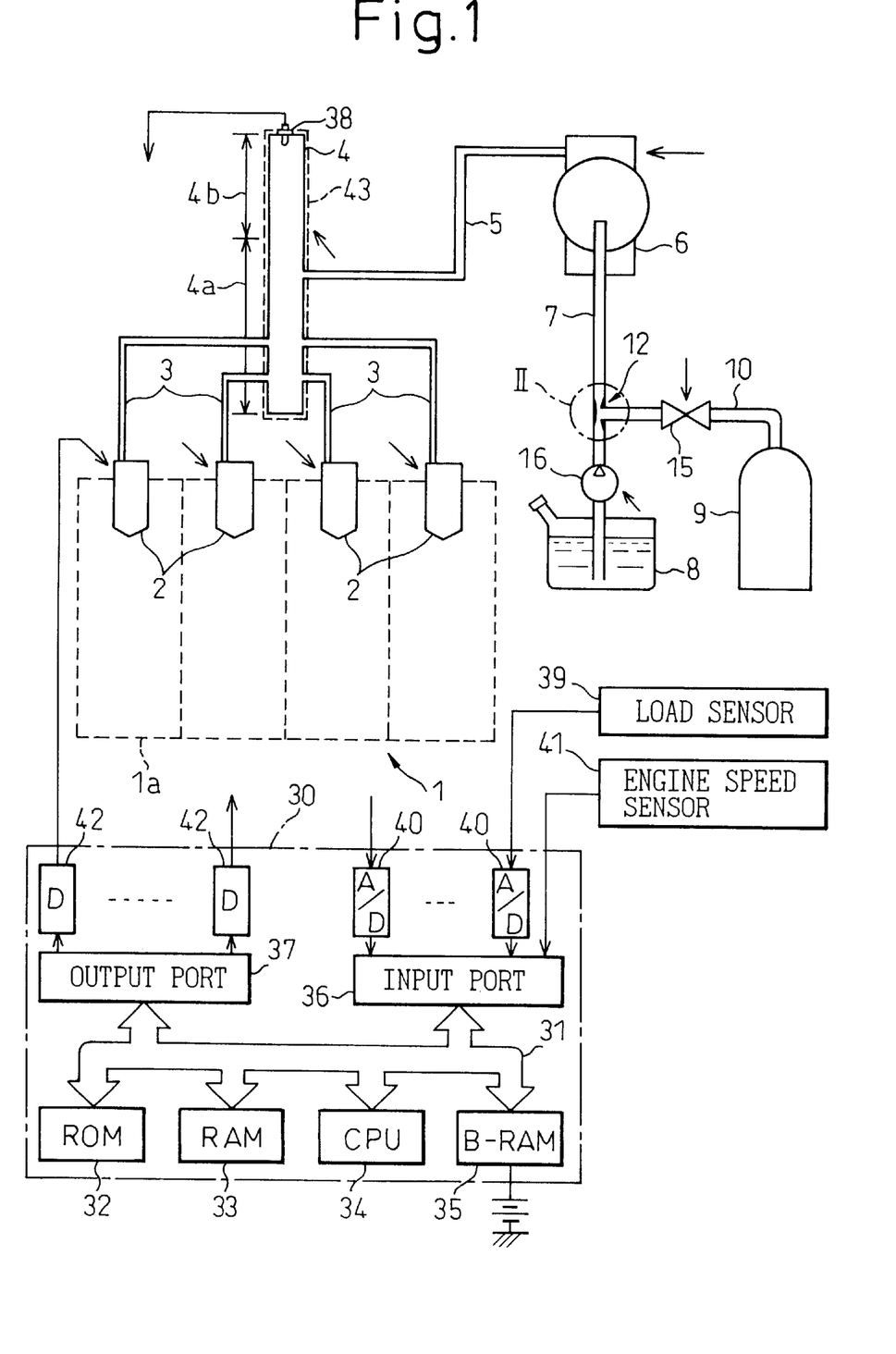
FIG. 1 is an overall view of a diesel engine.

FIG. 1 shows a case where the present invention is applied to a diesel engine for a vehicle. Alternatively, the present invention may be applied to a spark-ignition type, a gasoline engine, or an engine for a device other than a vehicle.

Referring to FIG. 1, an engine body 1 comprises a plurality of cylinders, such as four cylinders 1a. Each cylinder 1a comprises an injector 2 of, for example, an electromagnetic type. The injectors 2 are connected to a receiver for a mixture or a common rail 4, which is common to the injectors 2, via respective dispensing conduits 3. The common rail 4 is connected to an outlet of a pressurizing pump 6, via a high-pressure conduit 5. The pressurizing pump 6 is of, for example, an engine-driven type, and the pumping pressure thereof is controllable. An inlet of the pressurizing pump 6 is connected to a fuel tank 8 via a fuel feeding conduit 7. The fuel tank 8 contains therein a liquid fuel, which is light oil in this embodiment.

On the other hand, an additional fluid tank or container 9 contains therein an additional fluid in the form of liquid, which has a density different from that of the liquid fuel. The additional fluid may be at least one selected from water, carbon dioxide, hydrogen, and hydrocarbon such as alcohol, methane, and ethane. Note that, in the embodiment shown in FIG. 1, a liquid that has a density lower than that of the liquid fuel is used as the additional fluid.

An additional fluid feeding conduit 10 extends from the additional fluid tank 9, and an outlet thereof is connected to the fuel feeding conduit 7. This connecting portion is now explained hereinafter.

Figure 2:
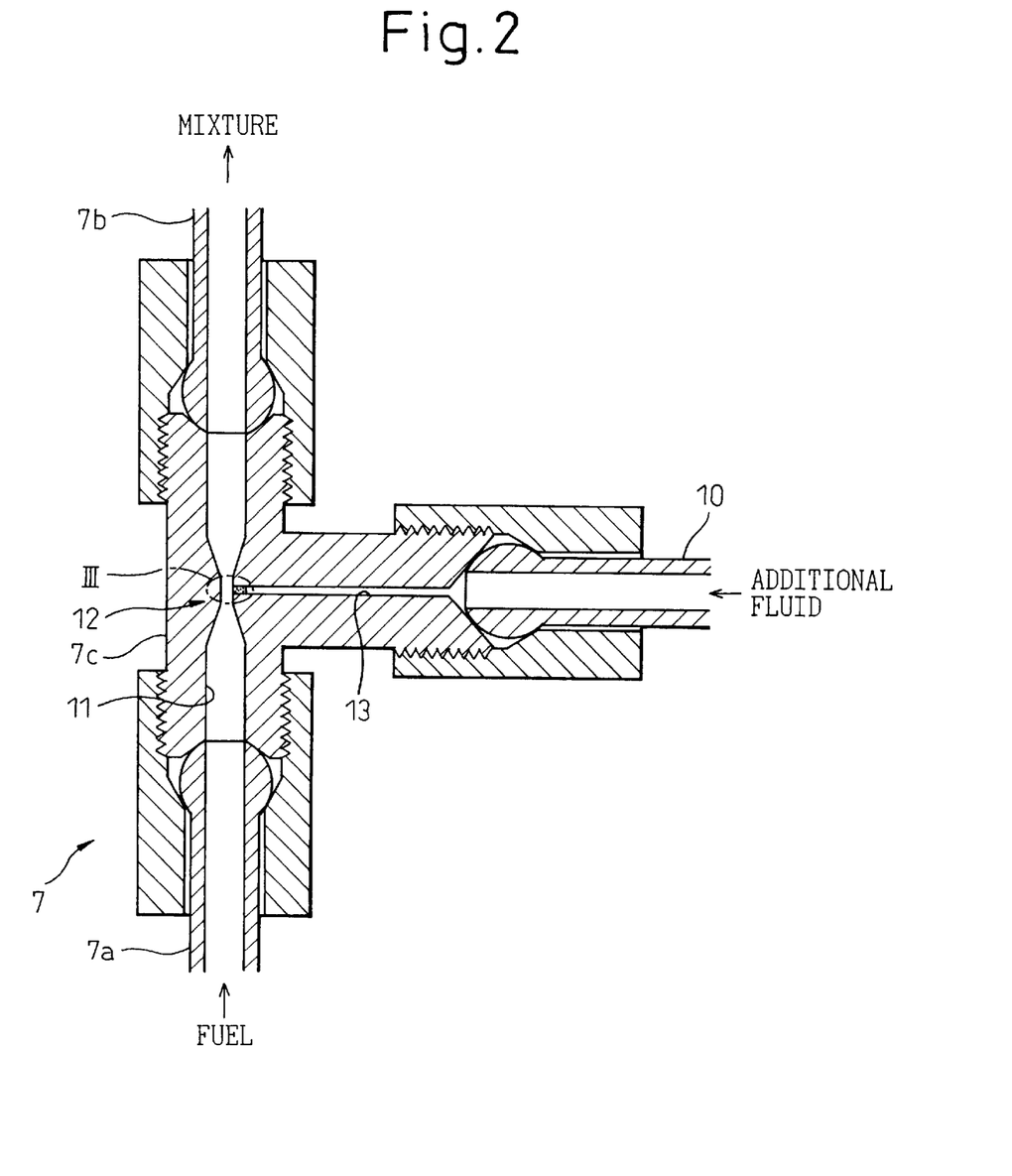
FIG. 2 is an enlarged view of a part II in FIG. 1.

Referring to FIGS. 1 and 2, the fuel feeding conduit 7 comprises an upstream conduit 7a extending from the fuel tank 8, a downstream conduit 7b extending to the pressurizing pump 6, and a connecting conduit 7c extending between the conduits 7a and 7b. The additional fluid feeding conduit 10 is connected to the connecting conduit 7c. Specifically, a fuel passage 11 which communicates the upstream and downstream conduits 7a and 7b each other is formed in the connecting conduit 7c, and a choke 12 is formed in the fuel passage 11. An additional fluid passage 13 is also formed in the connecting conduit 7c to extend from the fuel passage 11 in the choke 12, and is connected to the additional fluid feeding conduit 10. In other words, the outlet of the additional fluid passage 13 opens out in the fuel passage 11 in the choke 12.

Figure 3:
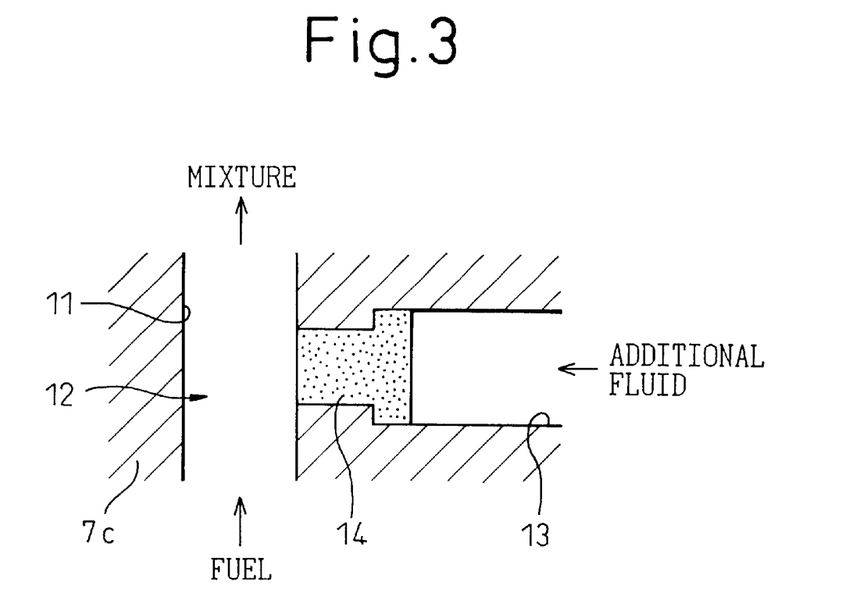
FIG. 3 is an enlarged view of a part III in FIG. 2.

Referring to FIG. 3 which shows an enlarged view of the outlet of the additional fluid passage 13, the outlet is provided with a porous member 14 which is made of ceramic, for example. Alternatively, the porous member 14 may be of a metal plate having many holes, or a woven or unwoven fabric of a metal or a ceramic fiber.

Referring to FIG. 1 again, a control valve 15 which is of, for example, an electromagnetic type, is arranged in the additional fluid feeding conduit 10. The ratio of opening of the control valve 15 is controllable by controlling the duty ratio, for example. In addition, a feed pump 16, of which the pumping pressure is controllable, is arranged in the fuel feeding conduit 7 between the above-mentioned connecting portion and the fuel tank 8 or in the upstream conduit 7*a*. The feed pump 16 feeds the liquid fuel in the fuel tank to the pressurizing pump 6.

An electric control unit 30 is comprised of a digital computer and comprises a ROM (read only memory) 32, a RAM (random access memory) 33, a CPU (microprocessor) 34, a B-RAM (backup RAM) 35 which is always connected to the-power supply, an input port 36, and an output port 37, which are connected to each other via a bi-directional bus 31. A pressure sensor 38 is arranged in the common rail 4, and generates output voltages which are proportional to the pressure in the common rail 4. A load sensor 39 which generates output voltages representing an engine load, such as an amount of an intake air or the depression of the acceleration pedal, is also provided. The output voltages of the sensors 38, 39 are input to the input port 36 via respective AD converters 40. An engine speed sensor 41 which generates pulses representing an engine speed is also connected to the input port 36.

On the other hand, the output port 37 is connected to the injectors 2, the pressurizing pump 6, the control valve 15, and the feed pump 16, via respective drive circuits 42.

In addition, the common rail 4 is provided with a temperature control unit 43 for controlling the temperature of the mixture in the common rail 4. The unit 43 comprises a heating device such as an electric heater, which is connected to the output port 37 via the respective drive circuit 42.

The common rail 4 has a cylindrical configuration, and is arranged so that a longitudinal axis thereof is directed substantially vertically. For the common rail 4, a fuel region 4*a* and ah additional fluid region 4*b* are defined along the longitudinal axis, and the fuel region 4*a* is positioned lower than the additional fluid region 4*b*. The inlets of the dispensing conduits 3 and the outlet of the high-pressure conduit 5 open out in the fuel region 4*a*. Note that the outlet of the high-pressure conduit 5 opens out between the inlets of the dispensing conduits 3 and the additional fluid region 4*b*.

When the pressurizing pump 6 and the feed pump 16 are operated, the liquid fuel in the fuel tank 8 flows through the fuel feeding conduit 7 toward the pressurizing pump 6. This produces a pressure reduction at the choke 12, which introduces the additional fluid in the additional fluid tank 9 into the fuel passage 11 through the additional fluid feeding conduit 10. In this way, a mixture of the liquid fuel and the additional fluid is formed, and is then directed to the pressurized pump 6.

Note that the flow rate of the additional fluid inflowing to the fuel passage 11 increases as the pressure reduction or drop applied to the outlet of the additional fluid passage 13 increases, and the pressure reduction increases as the flow rate of the liquid fuel flowing through the fuel passage 11 increases. Accordingly, when the ratio of opening of the control valve 15 is kept constant, a mixture ratio, which is a ratio of an amount of the additional fluid to that of the liquid fuel, is kept substantially constant.

In addition, the additional fluid enters the fuel passage 11 through the micropores of the porous member 14. As a result, the additional fluid comes into the liquid fuel flow in the form of droplets, and therefore, the liquid fuel and the additional fluid are mixed with each other uniformly.

The mixture formed in this way is then pressurized by the pressurizing pump 6, and then enters the common rail 4. The pumping pressure of the pressuring pump 6 is controlled to maintain the pressure in the common rail 4 at a pressure P1 higher than the critical pressure PC of the additional fluid, and the output of the heater 43 is set in advance to maintain the temperature of the mixture in the common rail 4 at a temperature T1 higher than the critical temperature TC of the additional fluid. Accordingly, the mixture is exposed to a supercritical state forming environment in which the additional fluid is in its supercritical state. In this way., the additional fluid is turned to its supercritical state in the common rail 4, and the mixture at this time consists of the liquid fuel and the additional fluid in its supercritical state.

Note that the supercritical state forming environment mentioned above is established by the pressurizing pump 6 and the heater 43. Therefore, the pressurizing pump 6 and the heater 43 can be considered to constitute a supercritical state forming device.

The mixture is then supplied via the dispensing conduits 3 to the injectors 2, and is then injected from the injectors to the combustion chambers of the engine. This promotes the atomization of the liquid fuel, and ensures a good combustion.

Mechanism of this promotion of the atomization is not, clear. However, it is thought that the mechanism can be explained as follows.

Molecules of the additional fluid in its supercritical state can move extremely freely with respect to that with its liquid state. Therefore, molecules of the additional fluid can easily enter between molecules of the liquid fuel, which reduces the surface tension of the liquid fuel. As a result, the liquid fuel after being injected cannot form droplets having a large diameter, and thus forms droplets having a small diameter. In this way, the atomization is promoted.

According to this mechanism, the degree of the promotion of the atomization depends on the mixture ratio. Specifically, the degree of the promotion increases as the mixture ratio increases. This means that a fluctuation of the mixture ratio would undesirably fluctuate the degree of the promotion of the atomization.

In the present embodiment, as mentioned above, the mixture ratio is kept substantially constant as long as the ratio of opening of the control valve 15 is kept constant. Accordingly, the stable promotion of the atomization is ensured.

On the other hand, if the additional fluid vaporizes before it is mixed with the liquid fuel, or before it is turned to its supercritical state even after it is mixed with the liquid fuel, the liquid fuel and the additional fluid cannot mix with each other uniformly. Although molecules of the additional fluid in its supercritical state can move freely, it is difficult to obtain a good promotion of the atomization with such a nonuniform mixture.

In addition, if the additional fluid vaporizes, the volume thereof increases. Therefore, it is difficult to feed the additional fluid sufficiently.

In addition, if the additional fluid vaporizes, the volume thereof increases. Therefore, it is difficult to feed the additional fluid sufficiently.

In the present embodiment, the additional fluid is kept in its liquid state from the additional fluid tank 9 to the pressurizing pump 6.

Specifically, the temperature in the additional fluid feeding conduit 10 and fuel feeding conduit 7 from the additional fluid tank 9 to the pressurizing pump 6 is kept lower than the critical temperature TC of the additional fluid. If the temperature of the additional fluid exceeds its critical temperature TC, the additional fluid cannot be in its liquid state at any higher pressure. Note that, in the embodiment shown in FIG. 1, the temperature of the additional fluid does not exceed its critical temperature TC, and, therefore, a temperature control device or a cooling device is not provided for the additional fluid. Alternatively, a temperature control device or a cooling device can be used if necessary.

In addition, the pressure of the additional fluid at least from the additional fluid tank 9 to the pressurizing pump 6 is maintained higher than the vaporizing (liquefying) pressure of the additional fluid which depends on the. temperature of the additional fluid. In the present embodiment, the pumping pressure of the feed pump 16 is set higher than the vaporizing pressure of the additional fluid. This maintains the pressure in the fuel feeding conduit 7 and the additional fluid feeding conduit 10 from the feed pump 16 to the pressurizing pump 6 higher than the vaporizing pressure of the additional fluid, and avoids the vaporization of the additional fluid.

Strictly speaking, the additional fluid is fed using the pressure reduction applied to the outlet of the additional fluid passage 13 in the present embodiment, and thus the pumping pressure of the feed pump 16 is set so that the pressure at the outlet of the additional fluid passage 13 is still higher than the vaporizing pressure of the additional fluid.

In addition to the additional fluid, the fuel may also be turned to its supercritical state. However, according to the mechanism of the promotion of the atomization as mentioned above, the promotion of the atomization is ensured by turning only the additional fluid into its supercritical state. Further, it is not preferred to turn both to their supercritical states, considering the energy consumption.

In the present embodiment, the mixture is formed from the fuel which is not in its supercritical state and the additional fluid which is in its supercritical state, and is then injected to the engine. In other words, the pressure and the temperature in the common rail 4 is set t6 avoid the fuel from being in its supercritical state, while the additional fluid is in its supercritical state.

This is established only when at least one of the critical pressure and the critical temperature of the additional fluid is lower than the respective value of the fuel.

The control of the duty ratio D of the control valve 15 is now explained with reference to FIG. 4.

Figure 4:
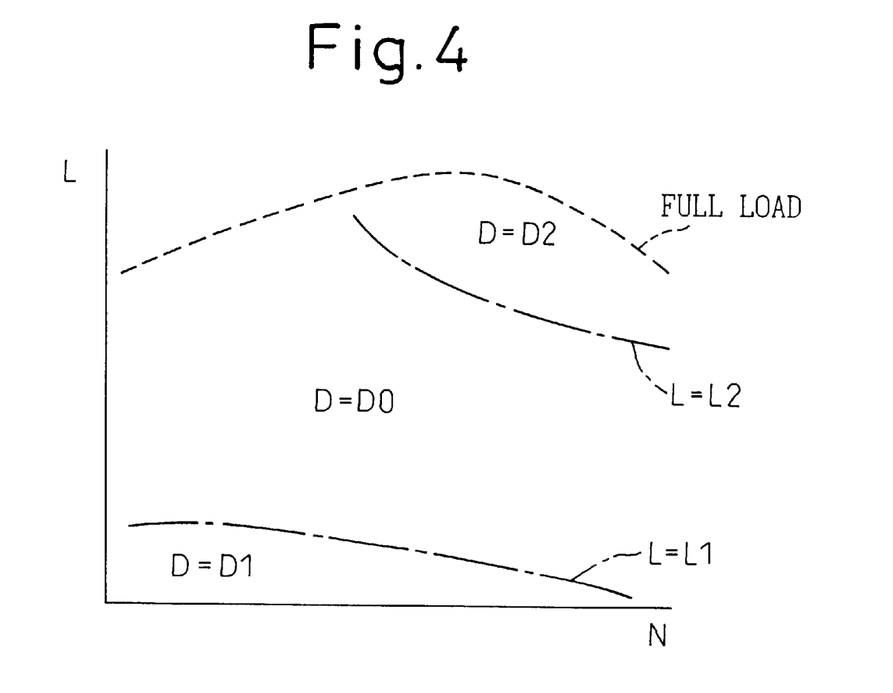
FIG. 4 is a diagram illustrating a duty ratio D of a control valve.

As shown in FIG. 4, the duty ratio D is set to D0 which may be the maximum (100%) when the engine is in the normal operation in which the engine load L is higher than a first predetermined load L1 and is lower than a second predetermined load L2 which is higher than L1. It can be said in another aspect that the cross sectional areas of the choke 12 and the additional fluid passage 13, for example, are set so that the mixture ratio is suitable with D=D0.

Contrarily, when the engine is in the low-load operation in which L≦L1, the duty ratio D is set to D1 which is smaller than D0. This means that the mixture ratio is reduced. When the engine is in the low-load operation, an amount of the fuel to be fed to the engine is small, and therefore the combustion may easily become unstable. Accordingly, the mixture ratio is reduced to reduce an amount of the additional fuel contained in the mixture, and thereby to make the combustion stable.

When the engine is in the high-load operation in which L≧L2, the duty ratio is set to D2 which is also smaller than D0. As a result, the mixture ratio is reduced also in this case. When the engine is in the high-load operation, an amount of the fuel to be fed to the engine is large, and therefore the injection period of the injector 2 would become extremely long if such a large amount of the fuel with the corresponding amount of the additional fluid should be injected. Therefore, the mixture ratio is reduced to shorten the injection period.

Note that D1 and D2 may be zero. In other words, the mixing of the liquid fuel and the additional fluid may be stopped when the engine is in the low- or high-load operation. In addition, the control valve 15 could be kept closed when the engine is stopped. This avoids the additional fluid from escaping from the additional fluid tank 9, especially when the additional fluid consists of a material which vaporizes at the normal temperature.

Figure 5:
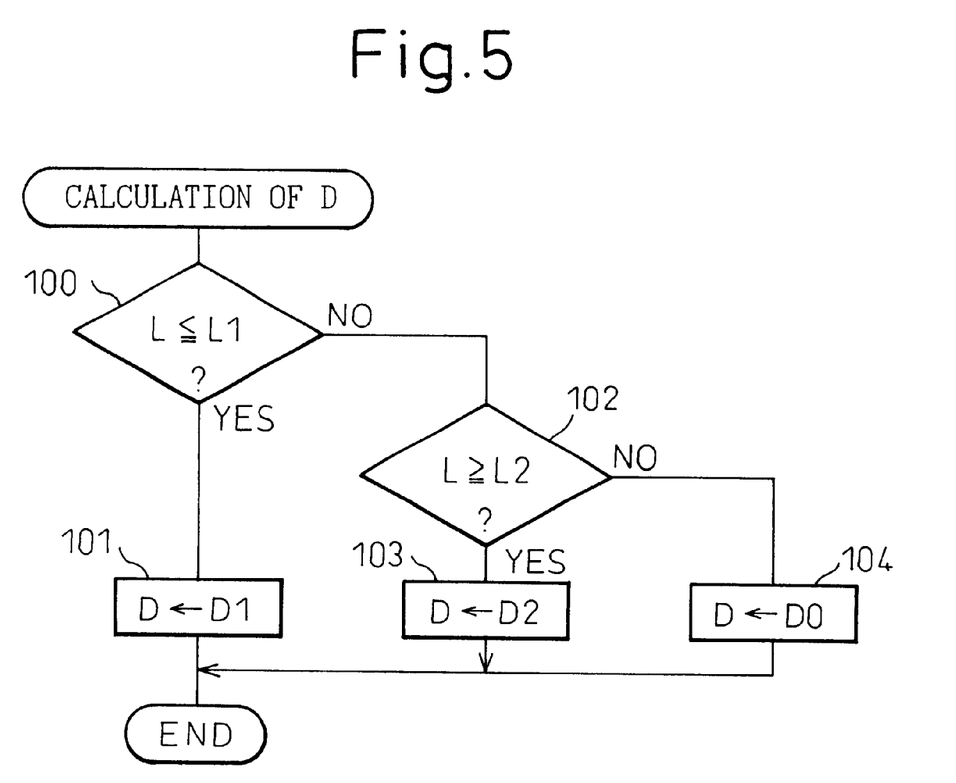
FIG. 5 is a flowchart illustrating a calculation routine of a duty ratio D.

FIG. 5 shows a routine for calculating the duty ratio D of the control valve 15. This routine is executed every predetermined time by interruption.

Referring to FIG. 5, in step 100, it is judged whether the engine load L is equal to or lower than the first predetermined load L1. When L≦L1, the routine goes to step 101, where the duty ratio D is set to D1. Contrarily, when L>L1, the routine goes to step 102, Where it is judged whether the engine load L is equal to or higher than the second predetermined load L2. When L≧L2, the routine goes to step 103, where the duty ratio D is set to D2.

When L<L2 in step 102, i.e., when L1<L<L2, the routine goes to step 104, where D is set to D0. The control valve 15 is controlled so that the duty ratio thereof is kept at D.

As mentioned at the beginning, when the additional fluid is not in its supercritical state during, for example, when the engine is stopped, the lower layer of the liquid fuel and the upper layer of the additional fluid would be formed in the common rail 4. Even during the time when the engine is in operation, the same may occur if the pressurizing pump 6 or the heater 43 malfunction.

The fuel region 4a and the additional fluid region 4b as mentioned above substantially correspond to regions which the fuel and additional layers respectively occupy. Therefore, the inlets of the dispensing conduits 3 and the outlet of the high-pressure conduit 5 open out in the fuel layer.

The inlets of the dispensing conduits 3 which opens out in the fuel layer-prevent the non-supercritical additional fluid in the additional fluid layer from flowing in the dispensing conduits 3, and the outlet of the high-pressure conduit 5 which opens out in the fuel layer prevents the non-supercritical additional fluid in the additional fluid layer from being entrained to the dispensing conduits 3 by the mixture newly fed to the common rail 4. This avoids combustion from deteriorating at the restart of the engine, for example.

When the engine is restarted, the.temperature in the common rail 4 increases gradually, and therefore, the additional fluid in the common rail 4 is turned to its supercritical state gradually. The additional fluid in its supercritical state would mix with the liquid fuel, and finally the two layers in the common rail 4 would disappear.

The dimensions of the liquid fuel and additional fluid layers in the common rail 4 which are formed when the engine is stopped, or the level of the interface between the liquid fuel and additional fluid layers, depend on the mixture ratio just before the engine is stopped. The mixture ratio is variable as mentioned above with reference to FIGS. 4 and 5. In the present embodiment, the fuel and additional regions 4a, 4b are defined to avoid the additional fluid layer from being formed in the fuel region 4a even when the mixture ratio varies.

Note that the additional fluid in the mixture newly fed from the high-pressure conduit 5 just after the restart of the engine is also not in its supercritical state. However, this additional fluid is mixed with the liquid fuel via the porous member 14 (FIG. 3), and therefore, is considered to have a different characteristic from the additional fluid contained in the additional fluid layer which separates from the liquid fuel.

Even if the additional fluid in the mixture newly fed from the high-pressure conduit 5 separates from the liquid fuel, the separated additional fluid will be directed upwardly to the additional fluid layer, and will not be directed to the dispensing conduits 3. This is because the outlet of the high-pressure conduit 5 opens out between the inlets of the dispensing conduits 3 and the additional fluid region 4b.

The common rail 4 may have a spherical configuration, for example. Alternatively, the common rail 4 having a cylindrical configuration may be arranged so that its longitudinal axis is directed horizontally. However, the common rail 4 having a cylindrical configuration with the longitudinal axis directed substantially vertically, as in the present embodiment, extends a distance from the inlets of the dispensing conduits 3 or the outlet of the high-pressure conduit 5 to the additional fluid layer, and keeps the interface area between the two layers small. This further prevents the non-supercritical additional fluid from entering the dispensing conduits 3.

In the present embodiment, both of the liquid fuel and the additional fluid are fed by the pressurizing pump 6. Alternatively, it can be said that a pump for feeding the liquid fuel also feeds the additional fluid. Therefore, no pump for feeding the additional fluid is needed. This makes a necessary space for installation small.

In the present embodiment, the outlet of the additional fluid passage 13 opens out in the choke 12 as shown in FIG. 2. Alternatively, the outlet may open out in the downstream of the choke 12, as long as the pressure reduction is applied to the outlet.

In addition, in the present embodiment, the porous member 14 is arranged at the outlet of the additional fluid passage 13 to mix the liquid fuel and the additional fluid uniformly. In order to promote such a uniform mixing, a device for stirring the mixture may be arranged downstream of the choke 12, such as in the fuel feeding conduit 7. The stirring device may comprise ribs arranged on the inner wall of the fuel feeding conduit 7 and spirally extending along longitudinal axis of the fuel feeding conduit 7.

Further, a fluid having a density larger than that of the liquid fuel may be used for the additional fluid. In this case, the fuel region 4a is defined in the upper side of the common rail 4, and the additional fluid region 4b is defined in the lower side.

Figure 6:
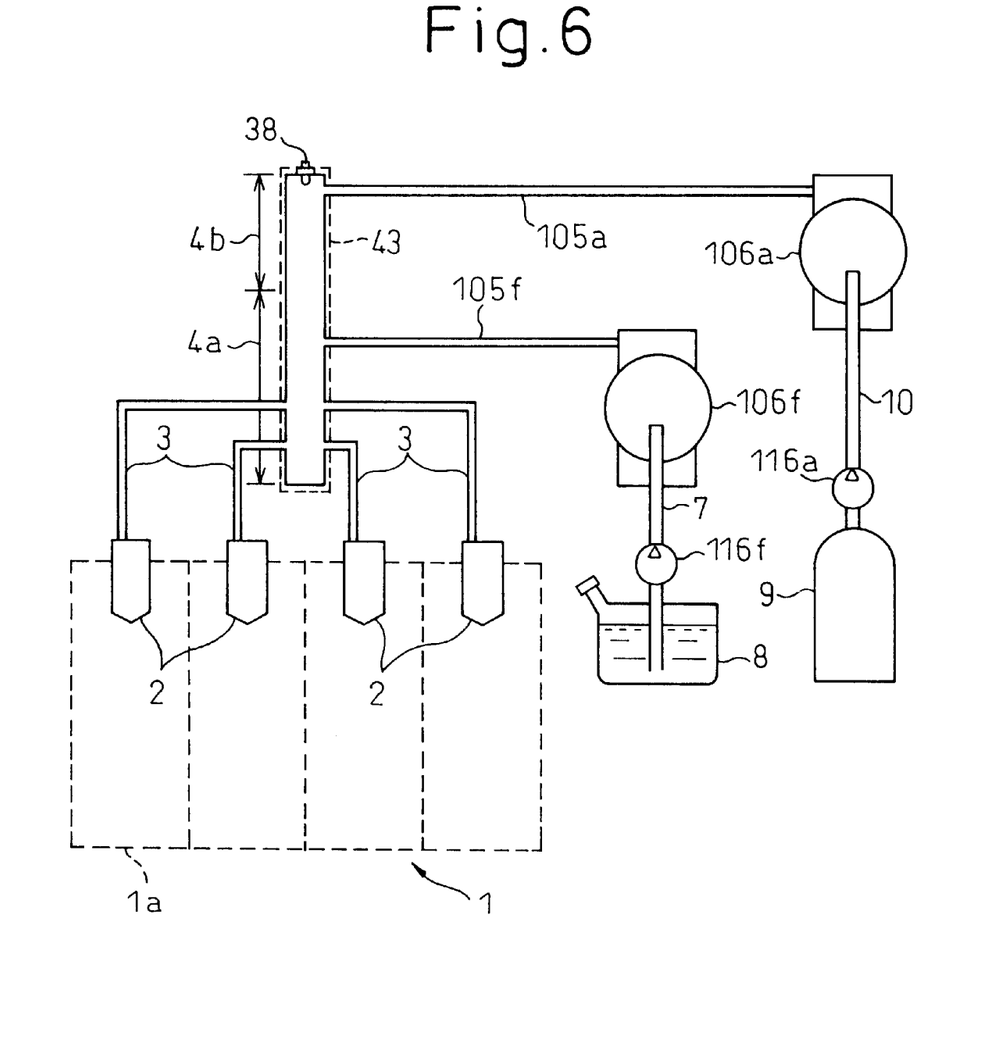
FIG. 6 is an overall view of a diesel engine according to another embodiment.

FIG. 6 shows another embodiment according to the present invention, in which the liquid fuel and the additional fluid are fed to the common rail 4 separately, and are mixed in the common rail 4.

Specifically, the fuel tank 8 is connected to a pressurizing pump 106f via the fuel feeding conduit 7, and the pressurizing pump 106f is connected to the common rail 4 via a high-pressure conduit 105f. On the other hand, the additional fluid tank 9 is connected to a pressurizing pump 106a via the additional fluid feeding conduit 10, and the pressurizing pump 106a is connected to the common rail 4 via a high-pressure conduit 105a. Feed pumps 116f and 116a are arranged in the respective feeding conduits 7 and 10.

The pressuring pumps 106f and 106a are the same type of the pressuring pump 6 as mentioned above, and the pumping pressures of the pumps 106f and 106a are controlled to maintain the pressure in the common rail 4 higher than the critical pressure of the additional fluid.

The outlet of the high-pressure conduit for the liquid fuel 105f opens out in the fuel region 4a, and between the inlets of the dispensing conduits 3 and the additional fluid region 4b, while the outlet of the highpressure conduit for the additional fluid 105a opens out in the additional fluid region 4b.

The other constructions and operations of the device are the same as those of the embodiment shown in FIG. 1, and therefore the explanations thereof are omitted.

According to the present invention, it is possible to provide a fuel feeding device which is capable of preventing the combustion from deteriorating when the additional fluid in the receiver is not in its supercritical state.

What is claimed is:

1. A fuel feeding device for an engine, comprising:
   a source of a liquid fuel;
   a source of an additional fluid;
   a receiver;
   mixture forming means for forming in the receiver a mixture of the liquid fuel and the additional fluid fed from the respective sources, the additional fluid in the mixture being in its supercritical state;
   an injector for injecting the mixture in the receiver to the engine; and
   a supplying passage for supplying the mixture from the receiver to the injector, the supplying passage having an inlet which opens out in the receiver,
   wherein the additional fluid has a density different from that of the liquid fuel, which results in, when a separation of the mixture in the receiver occurs, that layers of the liquid fuel and the additional fluid are formed in the receiver, and
   wherein the inlet of the supplying passage is positioned with respect to the receiver to open out into the liquid fuel layer.

2. A fuel feeding device according to claim 1, wherein the receiver has a longitudinal axis and is arranged so that the longitudinal axis thereof is directed substantially vertically.

3. A fuel feeding device according to claim 2, wherein the receiver has a cylindrical configuration.

4. A fuel feeding device according to claim 1, wherein the mixture forming means comprises mixing means for mixing the liquid fuel and the additional fluid before they flow into the receiver, and a feeding passage for feeding the mixture from the mixing means to the receiver, the feeding passage having an outlet which opens out into the receiver.

5. A fuel feeding device according to claim 4, wherein the outlet of the feeding passage is positioned with respect to the receiver to open out in the liquid fuel layer.

6. A fuel feeding device according to claim 5, wherein the outlet of the feeding passage is positioned with respect to the receiver to open out between the outlet of the supplying passage and the additional fluid layer.

7. A fuel feeding device according to claim 4, wherein the mixing means comprises a liquid fuel feeding passage extending from the liquid fuel source and an additional fluid feeding passage extending from the additional fluid source, wherein the liquid fuel feeding passage includes a choke, and wherein the additional fluid feeding passage is connected to the liquid fuel feeding passage around the choke.

8. A fuel feeding device according to claim 1, wherein the mixture forming means comprises a liquid fuel feeding passage for feeding the liquid fuel from the liquid fuel source to the receiver, the liquid fuel feeding passage having an outlet which opens out into the receiver, and wherein the outlet of the liquid fuel feeding passage is positioned with respect to the receiver to open out into the liquid fuel layer.

9. A fuel feeding device according to claim 8, wherein the mixture forming means comprises an additional fluid feeding passage for feeding the additional fluid from the additional fluid source to the receiver, the additional fluid feeding passage having an outlet which opens out into the receiver, and wherein the outlet of the additional fluid feeding passage is positioned with respect to the receiver to open out into the additional fluid layer.

10. A fuel feeding device according to claim 1, wherein the mixture forming means comprises supercritical state forming means for turning the additional fluid in the receiver to its supercritical state.

11. A fuel feeding device according to claim 10, wherein the supercritical state forming means comprises an electric heater for keeping the temperature of the mixture in the receiver higher than a critical temperature of the additional fluid.

12. A fuel feeding device according to claim 10, wherein the supercritical state forming means comprises a pressurizing pump for feeding the liquid fuel and the additional fluid to the receiver with a pumping pressure higher than a critical pressure of the additional fluid, to keep the pressure in the receiver higher than the critical pressure of the additional fluid.

13. A fuel feeding device according to claim 1, wherein the mixture forming means avoids the liquid fuel from being in its supercritical state.

14. A fuel feeding device according to claim 1, wherein the additional fluid is stored in its source in the liquid state.

15. A fuel feeding device according to claim 14, further comprising means for keeping the additional fluid in its liquid state from the additional fluid source to the mixture forming means.

16. A fuel feeding device according to claim 1, further comprising means for controlling a mixture ratio of an amount of the additional fluid to an amount of the liquid fuel in accordance with the engine operating condition.

17. A fuel feeding device according to claim 1, wherein the additional fluid is one selected from water, carbon dioxide, hydrogen, and hydrocarbon.

* * * * *